(12) United States Patent
Benabid et al.

(10) Patent No.: US 9,810,837 B2
(45) Date of Patent: Nov. 7, 2017

(54) HOLLOW CORE WAVEGUIDE WITH OPTIMIZED CONTOUR

(71) Applicants: UNIVERSITE DE LIMOGES, Limoges (FR); CNRS, Paris (FR); GLOPHOTONICS, Limoges (FR)

(72) Inventors: Fetah Benabid, Le Palais sur Vienne (FR); Frederic Gerome, Limoges (FR); Benoit Debord, Limoges (FR)

(73) Assignees: UNIVERSITE DE LIMOGES, Limoges (FR); CNRS, Paris (FR); GLOPHOTONICS, Limoges (FR)

(*) Notice: Subject to any disclaimer, the term of this patent is extended or adjusted under 35 U.S.C. 154(b) by 0 days.

(21) Appl. No.: 14/897,537

(22) PCT Filed: Jun. 4, 2014

(86) PCT No.: PCT/FR2014/051326
§ 371 (c)(1),
(2) Date: Dec. 10, 2015

(87) PCT Pub. No.: WO2014/199048
PCT Pub. Date: Dec. 18, 2014

(65) Prior Publication Data
US 2016/0124144 A1 May 5, 2016

(30) Foreign Application Priority Data
Jun. 10, 2013 (FR) ...................... 13 55314

(51) Int. Cl.
*G02B 6/02* (2006.01)
*B29D 11/00* (2006.01)

(52) U.S. Cl.
CPC .... *G02B 6/02328* (2013.01); *B29D 11/00663* (2013.01); *G02B 6/02338* (2013.01); *G02B 6/02347* (2013.01)

(58) Field of Classification Search
CPC G02B 6/02328; G02B 6/02347; G02B 6/032; G02B 6/02304; G02B 1/005
See application file for complete search history.

(56) References Cited

U.S. PATENT DOCUMENTS 6,539,155 B1 * 3/2003 Broeng ............ B29D 11/00721
385/125
6,985,661 B1 1/2006 Russell et al.
(Continued)

FOREIGN PATENT DOCUMENTS

| GB | 2 389 915 A | 12/2003 |
|---|---|---|
| WO | 2006/077437 A1 | 7/2006 |
| WO | 2009/044100 A1 | 4/2009 |

OTHER PUBLICATIONS

Wang Y Y et al: Low loss broadband transmission in hypocycloid-core Kagome hollow-core photonic crystal fiber, Optics Letters; The Optical Society, vol. 36, No. 5, Mar. 1, 2011 (Mar. 1, 2011), pp. 669-671, XP001560624, ISSN: 0146-9592, 001: 10.1364/0L.36. 000669 [retrieved on Feb. 23, 2011].
(Continued)

*Primary Examiner* — Thomas A Hollweg
*Assistant Examiner* — Mary A El Shammaa
(74) *Attorney, Agent, or Firm* — Young & Thompson

(57) ABSTRACT

A waveguide with a hollow core (16) delimited by a closed contour includes a succession of arcs (20) of negative curvature, each arc including a chord (24), characterized in that the contour of the hollow core (16) includes small arcs (PA) and large arcs (GA) arranged alternately, each arc (20) being symmetric with respect to a straight line passing through the center (18) of the hollow core (16) and the middle of the chord (24) thereof, the ratio b=2Ra/C of the large arcs being greater than 0.9 for the large arcs (GA), Ra corresponding to the maximum distance between the chord
(Continued)

Figure 1:
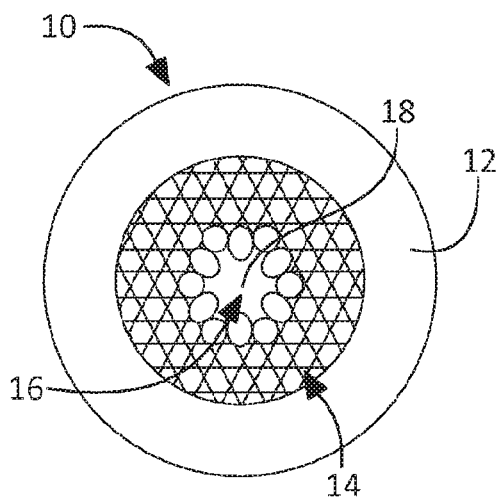

(24) and the arc (20), C corresponding to the length of the chord (24).

20 Claims, 2 Drawing Sheets

(56) References Cited

U.S. PATENT DOCUMENTS

| | | | |
|---|---|---|---|
| 7,315,678 B2 | 1/2008 | Siegel et al. | |
| 7,821,704 B1* | 10/2010 | Pepper | H01S 3/06708 359/344 |
| 8,159,742 B2* | 4/2012 | Dong | G02B 6/02009 359/341.1 |
| 8,285,099 B2* | 10/2012 | Dong | G02B 6/02009 359/341.1 |
| 2005/0185908 A1 | 8/2005 | Roberts et al. | |
| 2005/0226578 A1 | 10/2005 | Mangan et al. | |
| 2005/0232560 A1* | 10/2005 | Knight | C03B 37/0122 385/125 |
| 2005/0276556 A1* | 12/2005 | Williams | C03B 37/0122 385/123 |
| 2006/0257068 A1* | 11/2006 | Ruf | G01J 3/28 385/12 |
| 2010/0046560 A1* | 2/2010 | Liu | G02B 6/02328 372/6 |
| 2010/0247046 A1* | 9/2010 | Dong | B29D 11/00663 385/123 |
| 2010/0303429 A1* | 12/2010 | Gibson | C03B 37/02781 385/125 |
| 2011/0085769 A1 | 4/2011 | Dong et al. | |
| 2011/0267612 A1* | 11/2011 | Roberts | G02B 6/02328 356/301 |
| 2012/0082410 A1* | 4/2012 | Peng | G02B 6/02304 385/11 |

OTHER PUBLICATIONS

International Search Report, dated Sep. 26, 2014, from corresponding PCT Application.

* cited by examiner

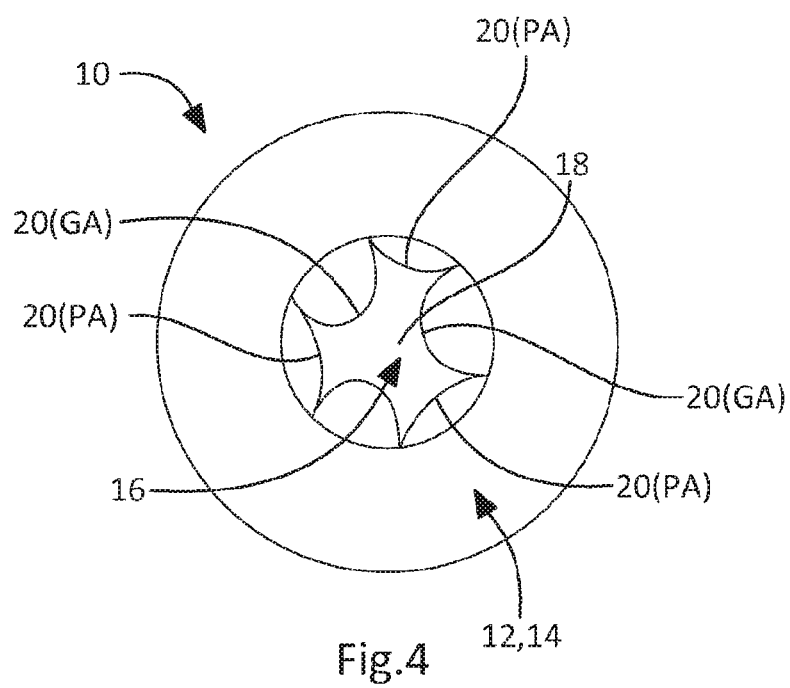
Fig.4
Fig.5A
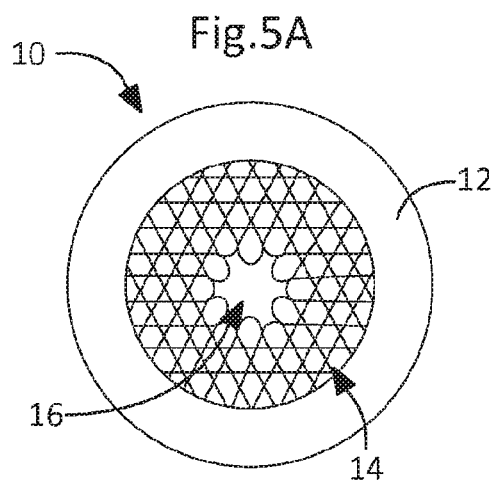
Fig.5B
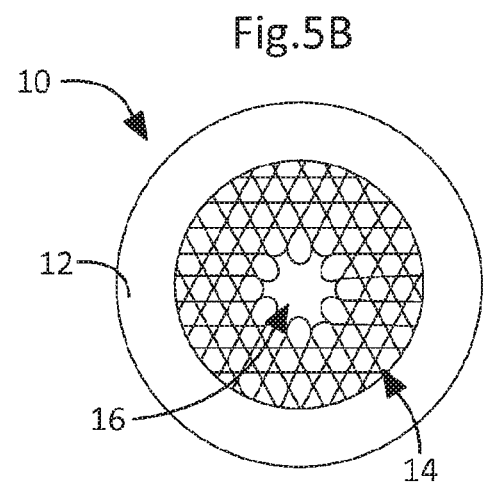
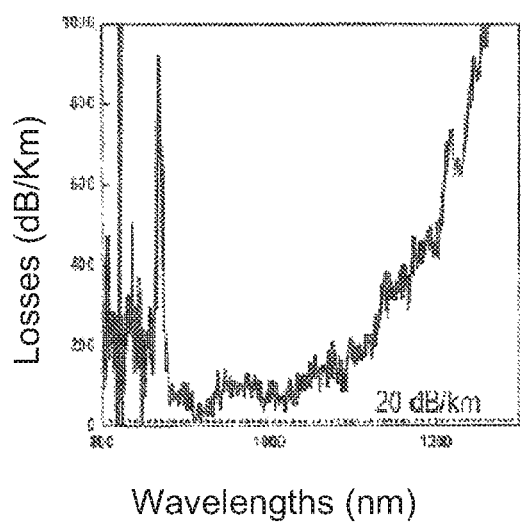
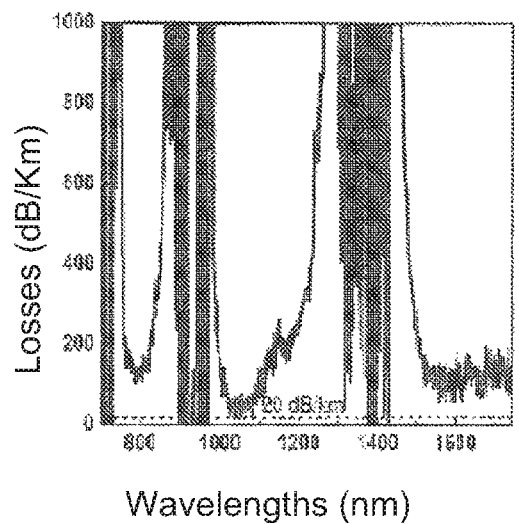

HOLLOW CORE WAVEGUIDE WITH OPTIMIZED CONTOUR

BACKGROUND OF THE INVENTION

Field of the Invention

This invention relates to a hollow-core waveguide with an optimized contour that makes it possible in particular to reduce transmission losses. It relates more particularly to a hollow-core photonic crystal fiber with an optimized contour for a transmission with low linear losses, a modal content that approaches and equals the monomodal speed, and finally a very poor recovery of the mode field guided with the material that constitutes the hollow-core contour.

Description of the Related Art

The photonic crystal fibers (FCP or PCF in English for "photonic crystal fiber") are waveguides formed by a periodic two-dimensional network of inclusions that extend over the entire length of the fibers. Owing to their structures, these fibers ensure that the electromagnetic waves are confined in the fiber core.

These photonic crystal fibers offer a large variety of possibilities for guiding by adjusting their opto-geometric parameters, such as, for example, the diameter of inclusions, the distribution of inclusions, the periodicity (step between two inclusions), the number of layers, and the index of materials used. Multiple techniques can be used for producing these photonic crystal fibers.

According to a first so-called stacking and drawing operating mode (in English, "stack and draw"), capillaries in the form of hollow tubes of 1 to 2 mm in diameter are assembled in a bunch. This bunch is then inserted into a tube for ensuring that the capillaries are held. The tube and the bunch of capillaries are then drawn.

In the case of a hollow-core photonic crystal fiber, the center does not comprise capillaries so as to form the hollow core.

According to another operating mode, a cylinder can be machined in such a way as to generate the inclusions and is then drawn.

The photonic crystal fibers comprise solid-core photonic crystal fibers and hollow-core fibers (HC-PCF fibers).

This invention relates more particularly to hollow-core photonic crystal fibers.

By way of example, the document U.S. Pat. No. 7,315, 678 describes a waveguide in the form of a hollow-core photonic crystal fiber comprising a sheath with a triangular structure, with the absence of a capillary in the central part forming the hollow core. Before the drawing phase, the hollow core is delimited by a series of arcs that correspond to the walls of the capillaries that delimit the hollow core. According to a particular feature of this invention, before the drawing phase, the hollow core, in a cross-section, has a non-circular shape with a first dimension in a first direction that is larger than a second dimension in a second direction. During the drawing phase, the arcs that form the contour of the hollow core have a tendency to become flattened, although the hollow core has an approximately circular cross-section after the drawing phase. According to this document, the fiber that is described makes it possible to obtain low losses, on the order of 1 dB/m for a range of wavelengths extending from 1 mm to 1.5 µm and whose guiding is optimized for the spectral range of "terahertz."

Based on the nature of the guiding, the photonic crystal fibers comprise photonic band gap-guided fibers (BIP fiber or PBG fiber in English for "photonic band gap fiber") as well as fibers with inhibited coupling guiding (in English, inhibited coupling guiding HC-PCF), also called large-pitch fibers (in English, large-pitch HC-PCF), or Kagome-type fibers.

The hollow-core fibers with photonic band gap guiding according to the prior art have the following drawbacks:

Even if for certain wavelengths on the order of 1.5 µm, it is possible to obtain transmission losses on the order of 1 dB/km, this value increases very quickly for shorter wavelengths. Thus, for the wavelengths of the visible range, the transmission losses can reach 1,000 dB/km.

According to another problem, these fibers with photonic band gap guiding have a bandwidth on the order of 70 THz that may prove too narrow for certain applications such as non-linear optics, the guiding of very short laser pulses.

According to another problem, the hollow-core fibers with photonic band gap guiding of the prior art have a dispersion that is too high and structured for certain applications such as high-resolution spectroscopy or the guiding of very short laser pulses.

Finally, according to another problem, the hollow-core fibers with photonic band gap guiding of the prior art have a strong recovery of power between the mode guided in the core and the contour that produces a low laser damage threshold.

The fibers with inhibited coupling guiding have the advantage of obtaining an ultra-wide bandwidth in contrast to the hollow-core fibers with photonic band gap guiding. In return, these fibers have higher transmission losses than those of the hollow-core fibers with photonic band gap guiding, greater than 0.5 dB/m.

The fibers with inhibited coupling guiding may have different structures relative to the sheath.

According to a first so-called triangular structure, the network of inclusions comes in the form of capillaries with circular cross-sections, distributed over a hexagonal surface, with the centers of the capillaries being arranged in such a way as to form equilateral triangles.

According to a second structure called a Kagome-type structure, the network of inclusions is delimited by walls that are parallel to the direction of propagation of the fiber and oriented in three directions at 60° in such a way as to isolate channels with hexagonal cross-sections and others with triangular cross-sections. According to this arrangement, the three walls are not concurrent at the same point.

By way of example, the document WO2009/044100 describes a fiber with inhibited coupling guiding crystals with a Kogame-type structure.

To obtain this type of guiding, after the drawing phase, the walls of inclusions should be the finest possible and the longest possible between two consecutive nodes, which corresponds to large-pitch structures.

The publication "Low Loss Broadband Transmission in Hypocycloid-Core Kagome Hollow-Core Photonic Crystal Fiber" Mar. 1, 2011/Vol. 36, No. 5/OPTICS LETTERS" proposes a fiber with inhibited coupling guiding with a Kagome-type structure and a hollow core. More particularly, this document describes two fibers: a first fiber with an approximately circular core and a second fiber with a core that is delimited by a contour that comprises a series of arcs. According to this document, these arcs form a hypocycloidal contour.

In contrast to the first fiber that generates a transmission loss on the order of 1.4 dB/m, the second fiber generates a transmission loss on the order of 0.4 dB/m.

According to this document, it is possible to obtain a fiber that generates a transmission loss on the order of 180 dB/Km with a bandwidth on the order of 200 THz.

SUMMARY OF THE INVENTION

The purpose of this invention is to eliminate the drawbacks of the prior art by proposing a hollow-core waveguide that has an optimized contour that makes it possible to improve the performances of said fiber, in particular as far as transmission losses are concerned in particular for short wavelengths extending from shortest in the range of UV or EUV to longest in IR.

For this purpose, the invention has as its object a hollow-core waveguide that is delimited by a closed contour that comprises a series of arcs with a negative curvature, each arc comprising a chord, characterized in that the contour of the hollow core comprises small arcs and large arcs arranged alternately, each arc being symmetrical with respect to a straight line passing through the center of the hollow core and the middle of its chord, the ratio b=2Ra/C of the large arcs being greater than 0.9 for the large arcs, Ra corresponding to the maximum distance between the chord and the arc, C corresponding to the length of the chord.

Preferably, the thickness of the arcs is less than or equal to half the maximum guided wavelength.

The invention also proposes a hollow-core photonic crystal fiber whose contour of the hollow core is tailored to the geometry that is indicated above.

Preferably, the hollow-core photonic crystal fiber according to the invention comprises a sheath whose structure makes it possible to obtain a guiding by inhibited coupling. According to a preferred embodiment, the structure of the sheath is of the Kagome type.

The invention also relates to devices that comprise a waveguide or a photonic crystal fiber in accordance with the invention, such as a device that makes possible the offsetting of a laser power, a laser pulse compression device, a gas laser whose hollow core is filled by a gas, an imagery device, a frequency calibration device, a guiding device, whereby this list is not exhaustive.

BRIEF DESCRIPTION OF THE DRAWING FIGURES

Figure 2:
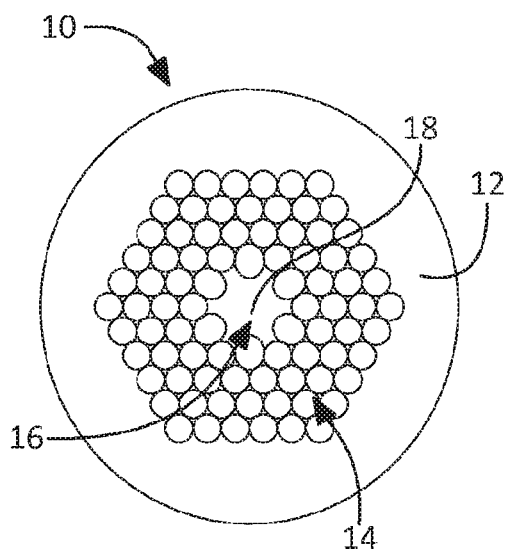
Figure 3:
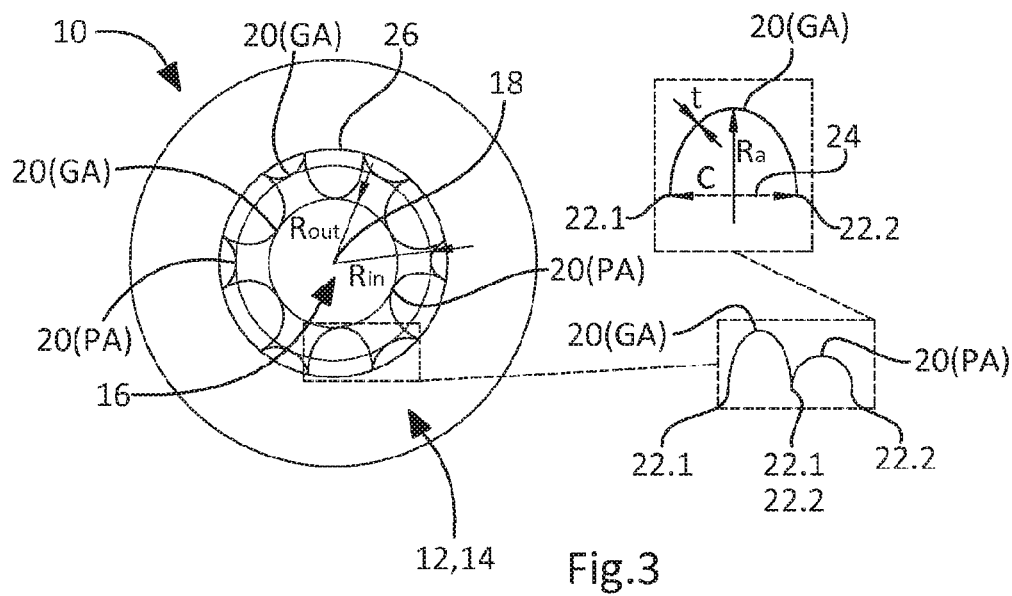

Other characteristics and advantages will emerge from the following description of the invention, a description that is provided only by way of example, relative to the accompanying drawings in which:

FIG. 1 is a cutaway of a first variant of a hollow-core photonic crystal fiber that illustrates the invention with a first sheath structure, FIG. 2 is a cutaway of another variant of a hollow-core photonic crystal fiber that illustrates the invention with another sheath structure, FIG. 3 is a cutaway that illustrates in detail the contour of the hollow core of the fiber illustrated in FIG. 2, FIG. 4 is a cutaway that illustrates in detail the contour of the hollow core of a fiber according to another variant of the invention, FIG. 5A is a cutaway of a fiber according to a first embodiment of the invention associated with a diagram that illustrates the curve of the transmission losses based on the wavelengths of said fiber, and FIG. 5B is a cutaway of a fiber according to another embodiment of the invention associated with a diagram that illustrates the curve of the transmission losses based on the wavelengths of said fiber.

DETAILED DESCRIPTION OF THE INVENTION

At 10, FIGS. 1 to 4 show a waveguide in the form of a photonic crystal fiber.

The photonic crystal fiber 10 comprises, from the outside to the inside, a protective envelope 12, a sheath 14, and a hollow core 16 that is delimited by a contour. The hollow core can comprise air or a gas that is suited to the function of the fiber.

The sheath 14 comprises a large number of inclusions that extend over the entire length of the photonic crystal fiber 10.

The center of the core of the fiber is referenced 18.

The structure of the sheath 14 (namely the distribution, the forms of inclusions, and the materials used) makes it possible to confine the electromagnetic waves in the hollow core 16.

According to a first variant that is illustrated in FIG. 1, the sheath 14 has a Kagome-type structure. According to another variant that is illustrated in FIG. 2, the sheath 14 has a triangular structure. Of course, the invention is not limited to these variants.

Thus, the pattern of the structure cannot be the same over the entire cross-section of the sheath. Thus, the sheath can have multiple concentric patterns relative to the center 18 of the fiber.

According to a preferred embodiment, the sheath has a structure that makes it possible to obtain inhibited coupling guiding. For this purpose, the structure of the sheath is called large pitch (in English, "large pitch"). Preferably, the sheath has a large-pitch structure of the Kagome type.

Thus, the structure of the sheath is selected in such a way as to impart the index of the sheath to the effective indices of the guided modes.

Large pitch is defined as the structure that has a pitch that is greater than or equal to five times the wavelength of the guided wave.

The sheath is not described in more detail because it can have different configurations. According to the variants, the sheath can be uniform, can comprise a periodic, quasi-periodic or non-periodic structure.

The hollow core 16 is delimited by a closed contour that comprises a series of arcs 20 with a negative curvature (bent part oriented toward the center 18). Each arc 20 comprises two tips 22.1 and 22.2, two adjacent arcs having a common tip. The sheath 14 plays the role of protecting and maintaining arcs 20.

According to an important point, for the rest of the description, the geometry of the hollow core is described as the finished fiber, or after the drawing phase in the case of a process for production integrating a drawing phase and not before the drawing phase.

Each arc 20 comprises a chord 24 that corresponds to the straight line that passes through the tips 22.1 and 22.2 of the arc.

Preferably, each arc 20 is symmetrical with respect to a straight line that passes through the center 18 and the middle of the chord 24. Thus, the tips 22.1 and 22.2 of all of the arcs 20 are arranged on a circle referenced 26 that has as its center the center 18 of the hollow core of the fiber. Each arc is a quasi-hypocycloid whose director circle is the circle 26 of the tips of the arcs.

For each arc 20, the chord has a length C, and Ra corresponds to the maximum distance between the chord 24 and the arc 20.

According to an important characteristic of the invention, the contour of the hollow core comprises small arcs PA and large arcs GA arranged alternately. Thus, each small arc PA is arranged between two large arcs GA, and each large arc GA is arranged between two small arcs PA. The contour comprises as many small arcs PA as large arcs GA.

According to the invention, the large arcs GA have a ratio b=2Ra/C that is greater than or equal to 0.9.

Preferably, all of the large arcs GA have the same ratio b.

Preferably, all of the small arcs PA have the same ratio b'=2Ra/C.

Advantageously, the ratio b' of the small arcs PA is less than or equal to 0.8.

According to a preferred embodiment that is illustrated in FIG. 3, the contour of the hollow core comprises six large arcs GA and six small arcs PA.

According to another embodiment that is illustrated in FIG. 4, the contour of the hollow core comprises three large arcs GA and three small arcs PA.

The invention is not limited to these embodiments. Regardless of the embodiment, the hollow contour comprises at least three large arcs GA and at least three small arcs PA.

As illustrated in the figures, the small arcs PA define an underlying circle Rout, and the large arcs define an underlying circle Rint that has a diameter that is smaller than the underlying circle Rint, the two underlying circles Rint and Rout having the same center 18, that of the hollow core of the fiber.

According to an embodiment that is illustrated in FIGS. 1 and 2, the hollow core 16 is delimited by capillaries whose centers are arranged on the circle 26, with the capillaries alternately being in the form of a circle and an ellipse and juxtaposed.

The geometry of the contour of the hollow core that is defined above makes it possible to prevent a spatial recovery between the fields of the mode that is guided into the hollow core and the contour, to increase the length of the contour, and consequently to enhance the inhibition of the coupling between the basic mode of the core with those carried by the contour. The geometry also makes it possible to push the tips 22.1, 22.2 as far back from the center 18 of the core as possible.

According to another characteristic of the invention, the thickness of the arcs 20 denoted t is less than or equal to half of the maximum guided wavelength. By way of example, if the maximum guided wavelength is equal to 2 μm, the thickness of the arcs is to be less than 1 μm.

Relative to the materials that are used, the material of the arcs 20 is selected in such a way as to obtain a refraction index that is greater than 1.2 in the target wavelength range.

According to an embodiment that is suitable for guiding waves in the range of microwave-type wavelengths that are on the order of 1 m to 1 mm, the thickness t of the arcs is on the order of 0.5 mm. The selected material is highly reflective, such as, for example, a reflective metal such as copper, or has a low absorption coefficient like quartz. In this wavelength range, the arcs 20 can be made of metal, glass, borosilicate glass, quartz, a ceramic material, polytetrafluoroethylene . . . .

According to an embodiment that is suitable for guiding waves in the range of THz wavelengths that are on the order of 100 μm to 1 mm, the thickness t of the arcs is on the order of 50 μm. The material that is selected is Teflon or a material that exhibits a low absorption coefficient and a refraction index that is greater than 1.2, such as, for example, polytetrafluoroethylene.

According to an embodiment that is suitable for guiding waves in the range of wavelengths that are on the order of 2 μm to 10 nm, the thickness t of the arcs is on the order of 1 μm. The selected material will be the most transparent possible, such as, for example, pure silica or soft glass.

For all of these wavelength ranges, the fiber can be obtained by stacking and drawing or by machining and drawing.

FIGS. 5A and 5B show hollow-core photonic crystal fibers with a contour that comprises six small arcs PA and six large arcs GA. These fibers comprise a Kagome-type structure. The structure can be produced by using the teachings of documents WO2006077437 and WO2009/044100.

These fibers are produced by stacking and drawing capillaries with circular cross-sections. The profile of the contour of the core will be obtained by optimizing the rheological parameters of the material, the temperatures and the pressure differentials between the capillaries during the implementation of the drawing phase.

In FIG. 5A, the fiber has a contour with b=0.9 and t=800 nm.

In FIG. 5B, the fiber has a contour with b=1 and t=1,400 nm.

The measurements taken in the spectral range extending from 800 nm to 1,200 nm show that the fibers guide by exhibiting low-guide bands that are due to an interaction that resonates between the guided modes in the core and those in the arcs. As can be seen in the diagrams, the transmission losses drop to a level of 20 dB/km for the wavelengths encompassed between 800 nm and 1,200 nm. By way of comparison, the fiber that is illustrated in the publication "Low Loss Broadband Transmission in Hypocycloid-Core Kagome Hollow-Core Photonic Crystal Fiber" Mar. 1, 2011/Vol. 36, No. 5/OPTICS LETTERS" has, for the largest arcs, a curvature b that is less than or equal to 0.75 and generates a transmission loss that at best is equal to approximately 180 dB/km.

Consequently, the optimization of the contour of the core and more particularly of the value b of the large arcs obtains a significant reduction of the transmission losses.

The optimization of the parameter of curvature b of the contour of the hollow core 18 makes it possible to increase the inhibition of the coupling and consequently to reduce the transmission losses of the waveguide. The optimization of the parameter of curvature b makes it possible to obtain a drastic reduction of the recovery of the optical power in the sheath that makes possible in particular the laser power offsetting.

The photonic crystal fiber according to the invention makes it possible to obtain a guide that combines a low transmission loss, a monomodal guiding, and a very high laser damage threshold.

Although described in a preferred manner applied to a photonic crystal fiber, the invention can be applied in a general manner to a waveguide. However, it is more particularly suitable for fibers with inhibited coupling guiding, which optimizes both the structure of the sheath and the contour of the hollow core.

The waveguide or the hollow-core fiber with inhibited coupling guiding with an optimized contour according to the invention can be used in the following (non-exhaustive) applications:

The offsetting of a laser power in the field of laser micro-machining, surgery, treatment of cells (cancerous cells), The compression by non-linear effects of laser pulses, in particular high-flux pulses, Terahertz imagery, Gas lasers, with a core that is filled with an active gas used as an amplification medium, The monomodal guiding and with low wave transmission losses in the range of microwaves or THz, The calibration of frequency, with the core being filled with a gas.

The invention claimed is:

1. A hollow-core waveguide, comprising:
   a closed contour that comprises a series of arcs with a negative curvature, each arc comprising a chord, wherein
   the contour of the hollow core comprises small arcs and large arcs arranged alternately, each arc being symmetrical with respect to a straight line passing through a center of the hollow core and the middle of the chord of the arc, a ratio $b=2Ra/C$ of the large arcs being greater than 0.9 for the large arcs, Ra corresponding to a maximum distance between the chord and the arc, C corresponding to a length of the chord.

2. The waveguide according to claim 1, wherein the contour of the hollow core comprises at least three small arcs and at least three large arcs.

3. The waveguide according to claim 1, wherein all of the large arcs all have the same ratio b.

4. The waveguide according to claim 1, wherein the ratio b' of the small arcs is less than or equal to 0.8.

5. The waveguide according to claim 1, wherein a thickness of the arcs is less than or equal to one-half of a maximum guided wavelength.

6. The waveguide according to claim 1, wherein a material of the arcs has a refractive index of greater than 1.2 in a range of target wavelengths.

7. The waveguide according to claim 1, wherein the hollow core is filled with a gas that is suitable for the function of the waveguide.

8. A hollow core photonic crystal fiber comprising the hollow-core waveguide according to claim 1, whose contour of the hollow core comprises small arcs and large arcs arranged alternately, each arc being symmetrical with respect to a straight line passing through the center of the hollow core and the middle of the chord, the ratio $b=2Ra/C$ of the large arcs being greater than 0.9 for the large arcs, Ra corresponding to the maximum distance between the chord and the arc, C corresponding to the length of the chord.

9. The fiber according to claim 8, wherein further comprising a sheath with a structure that makes possible to obtain an inhibited coupling guiding.

10. The fiber according to claim 9, wherein the structure of the sheath is a large-pitch Kagome.

11. A device that makes possible offsetting of a laser power that comprises the waveguide according to claim 1.

12. A laser pulse compression device that comprises the waveguide according to claim 1.

13. A gas laser comprising the waveguide according to claim 1.

14. An imaging device that comprises the waveguide according to claim 1.

15. A frequency calibration device that comprises the waveguide according to claim 1.

16. A guiding device that comprises a waveguide according to claim 1.

17. A device that makes possible offsetting of a laser power that comprises the fiber according to claim 8.

18. A laser pulse compression device that comprises the fiber according to claim 8.

19. An imagery device that comprises fiber according to claim 8.

20. A frequency calibration device that comprises the fiber according to claim 8.

* * * * *